(12) United States Patent
Howell

(10) Patent No.: US 10,542,179 B2
(45) Date of Patent: Jan. 21, 2020

(54) CALIBRATION AND VALIDATION OF MOTION PICTURE SCANS

(71) Applicant: iMetafilm Ltd., Glasgow (GB)

(72) Inventor: Michael Howell, Glasgow (GB)

(73) Assignee: iMetafilm, Glasgow (GB)

( * ) Notice: Subject to any disclaimer, the term of this patent is extended or adjusted under 35 U.S.C. 154(b) by 0 days.

(21) Appl. No.: 15/562,080

(22) PCT Filed: Mar. 22, 2016

(86) PCT No.: PCT/GB2016/050796
§ 371 (c)(1),
(2) Date: Sep. 27, 2017

(87) PCT Pub. No.: WO2016/156798
PCT Pub. Date: Oct. 6, 2016

(65) Prior Publication Data
US 2018/0077316 A1    Mar. 15, 2018

(30) Foreign Application Priority Data

Mar. 27, 2015 (GB) .................................. 1505350.7

(51) Int. Cl.
| | | |
|---|---|---|
| H04N 1/407 | (2006.01) | |
| G06T 7/90 | (2017.01) | |
| G06T 7/00 | (2017.01) | |
| H04N 1/00 | (2006.01) | |
| H04N 1/04 | (2006.01) | |
| H04N 5/253 | (2006.01) | |
| H04N 3/36 | (2006.01) | |

(52) U.S. Cl.
CPC ......... *H04N 1/4078* (2013.01); *G06T 7/0002* (2013.01); *G06T 7/90* (2017.01); *H04N 1/00819* (2013.01); *H04N 1/04* (2013.01); *H04N 3/36* (2013.01); *H04N 5/253* (2013.01); *H04N 2201/0408* (2013.01)

(58) Field of Classification Search
CPC combination set(s) only.
See application file for complete search history.

(56) References Cited

U.S. PATENT DOCUMENTS

| | | | | |
|---|---|---|---|---|
| 5,883,985 A | * | 3/1999 | Pourjavid | ............... H04L 29/06 345/20 |
| 5,982,427 A | | 11/1999 | Hunt | |
| 6,683,981 B1 | * | 1/2004 | Matama | ............... H04N 1/4078 358/1.9 |
| 6,724,498 B1 | * | 4/2004 | Shimazaki | ........... H04N 1/4055 358/1.8 |
| 7,787,010 B2 | * | 8/2010 | DiFrancesco | ............ H04N 5/87 348/96 |
| 2001/0030686 A1 | * | 10/2001 | Young, Jr. | .......... H04N 1/00267 348/96 |
| 2001/0030750 A1 | | 10/2001 | Young, Jr. | |
| 2002/0122166 A1 | * | 9/2002 | Saito | ...................... G03B 27/08 355/78 |

OTHER PUBLICATIONS

International Search Report for PCT/GB2016/050796, dated Jun. 28, 2016.

* cited by examiner

*Primary Examiner* — Alexander Gee
(74) *Attorney, Agent, or Firm* — Barnes & Thornburg LLP

(57) ABSTRACT

There is herein described a method and apparatus for the calibration and validation of motion picture scans.

19 Claims, 4 Drawing Sheets

CALIBRATION AND VALIDATION OF MOTION PICTURE SCANS

This application is a National Stage application of International Application No. PCT/GB2016/050796, filed Mar. 22, 2016. This application also claims priority to GB1505350.7, filed Mar. 27, 2015.

FIELD OF THE INVENTION

The present invention relates to a method and apparatus for the calibration and validation of motion picture scans.

BACKGROUND OF THE INVENTION

In a motion picture scanning system, it is very important to ensure that the light intensity on the imaging sensor is the same top to bottom and left to right. Furthermore, is also extremely important that the light intensity remains constant from the beginning of the scan of a reel to the end of the reel. Where the exposure intensity is intentionally varied during the scan—for example, to be suitable for reels which have sections of film of very variable density spliced together—then it is important to have a record of, and a validation of, the change in the scanning exposure intensity. However, it is not possible to verify this by eye, and there are no test patterns in a typical reel on which to determine the quality of the set-up.

Although there is the possible solution that it would be possible to include a test pattern outside the edges of a reel of film, this is not done due to the consequent loss of resolution available to the picture image. The present invention therefore addresses this problem.

A great part of our cultural heritage is stored on motion picture film and other photographic based films. However, these films can deteriorate over time. The present invention relates to part of the process of protecting the images stored on these films.

It is an object of at least one aspect of the present invention to obviate or mitigate at least one or more of the aforementioned problems.

It is a further object of at least one aspect of the present invention to provide a method and apparatus for the calibration and validation of motion picture scans which is capable of ensuring that the light intensity on the imaging sensor is the same top to bottom and left to right.

SUMMARY OF THE INVENTION

According to a first aspect of the present invention there is provided a method of calibrating motion picture scans using a transparent calibration pattern being placed in front of or behind a film wherein a user can view the transparent calibration pattern through perforations in the film.

Generally speaking, the present invention therefore resides in the provision of a method and apparatus for the calibration and validation of motion picture scans.

The transparent calibration pattern may therefore comprise a transparent substrate with any suitable pattern such as lines extending down the sides of the film. There may be a series of co-parallel lines with lines extending down the length of the film through the perforations in the film and also extending transversely across the film from one perforation to another. There may therefore be a series of patterns at right-angles to each other. A user may therefore view both calibration patterns extending down the length of the film and also transversely across the film. This then allows the user to calibrate the motion picture scans. This may of course be done automatically.

Using the method of the present invention it is therefore possible to measure intensities of the light to both evaluate intensity variations, and to apply corrections to the scanned image.

Using the calibration patterns allows both high and low intensity patterns to be calibrated.

Using the present invention it may therefore be possible to see the calibration patterns at multiple positions in the imaging field, and it may be possible to construct a very accurate map of intensity variation across the whole sensor. Where scanner exposure variation has been implemented, the test patterns provide the means to determine the values of the exposure variation from the scanned images.

The motion picture scans may therefore be digital images or digital video clips. The one or more digital images or digital video clips may be representative of images and/or data stored on or with one or more frames of the film.

In this way, enhanced or error corrected film images and/or digitally enhanced images, soundtracks and the like may be stored within the digital images or video clips representing the original frames of the film. By using calibration patterns both the original frames of the film and the enhanced version may be stored and viewed. As such, the original version is stored e.g. for historical interest, or to allow better processing techniques not available at the time of original processing to be applied at a later date, or to permit comparison between the enhanced and original versions of the film to determine processing errors and anomalies, or the like.

Each portion of the film may comprise a frame of film or preferably a part of a frame of the film. The method may comprise imaging the film using a processing apparatus or film scanner.

The calibration pattern will typically be significantly less than the width of perforations running up and down the sides of the film. This means that the pattern should always be visible through the perforation, even when the film moves slightly from side to side as is typical in a drive system that does not use sprockets.

The pattern may consist of a number of stripes of different density, typically four but any number may be used. The total width of the four stripes may typically be around 0.5 mm-2 mm or about 1 mm. The optical density of the stripes may typically be in the range from about 0.5 to 4 and preferably about 0.5, 1.0, 2.0 and 3.5. Given that the present invention uses 'fresh air' also, this gives 5 densities to be used to calibrate from which is a further advantage of the present invention.

The test pattern may typically be enclosed in a glass plate (similar to that used for test samples as viewed under a microscope) and may be placed underneath a film gate, typically 2-3 mm underneath the film. Given that the scanner has reasonable depth of field—which is important for an archive scanner as older film will not be flat—the density of the pattern will be measurable even though the image of the pattern will not be sharp. Given that the pattern is in a glass plate, any contact with badly warped film will not be harmful to the film. Further, given that the pattern is in a glass plate, it will remain flat to the camera lens so there will be no exposure variations due to movement or loss of tension.

If the film is 35 mm and has no soundtrack a calibration pattern may be mounted on both sides so that we measure both left and right intensities of the imaging field. If the film is 35 mm and has an analogue soundtrack, then the calibration pattern should be mounted on the side without soundtrack. If the film has only one set of perforations, then the calibration pattern must be mounted on that side.

The calibration pattern should be easily removable. Different sets of calibration patterns may be used according to specific requirements of the film reel. For example, if the film is very faded, and it is intended to expose at a lower intensity than normal, then a test pattern with lower densities may be used. Conversely, if the film is very dark, and high exposure is required, then the test pattern may use higher densities.

Each digitised image of a camera frame may therefore have at least some the calibration pattern visible through one perforation (e.g. 16 mm film) or four perforations (e.g. 35 mm film). Software can determine the intensity of the (typically four) stripes of the test pattern and therefore compute the exposure applied by the scanner. Through a calibration process, 'ideal' values for these intensities will be known, and using the intensities of each image we can therefore determine the exposure variation of each image. This enables the user to determine whether the exposure applied to each frame was as intended. If the intent was to scan the film at a constant light, then we can use the computed variation to correct minor changes in exposure or to determine that the exposure variation was unacceptable and hence reject the scan. In the case that the exposure variation was intentional—for example where light and dark sections of film are spliced together—the computed variation serves both to validate that the exposure was varied correctly, and to serve as a historical record of what exposure variation was applied. This information can then be used when the reel is viewed so that the user can see the film with or without the exposure variations applied.

Where the scanner uses an unsynchronised advance, then the perforations may move relative to the vertical axis of the camera frame. This means that a different section of the calibration pattern will be visible with each successive exposure. This means that we will see the exposure applied at a different vertical section of the frame. We can therefore validate that the exposures at each section are the same, and correct for minor differences encountered. Over even a small reel of film, it is likely that the perforations will move fully from top to bottom of the exposure field, which means that we can therefore compute exposure corrections for the full height of the frame.

Since the test pattern will remain in the digitised image of every frame, we will now have a permanent indicator of the exposure used in every scanned image. This means that scans can now be interpreted according to a universal standard. It also means that we can compensate for minor intensity variations during a scan. Further, it allows us to vary scanner intensities to suit content, yet to preserve a record of such variations in a way that means the information cannot be detached from.

BRIEF DESCRIPTION OF THE DRAWINGS

Embodiments of the present invention will now be described, by way of example only, with reference to the accompanying drawings in which.

BRIEF DESCRIPTION

Generally speaking, the present invention resides in the provision of a method and apparatus for the calibration and validation of motion picture scans.

Figure 1:
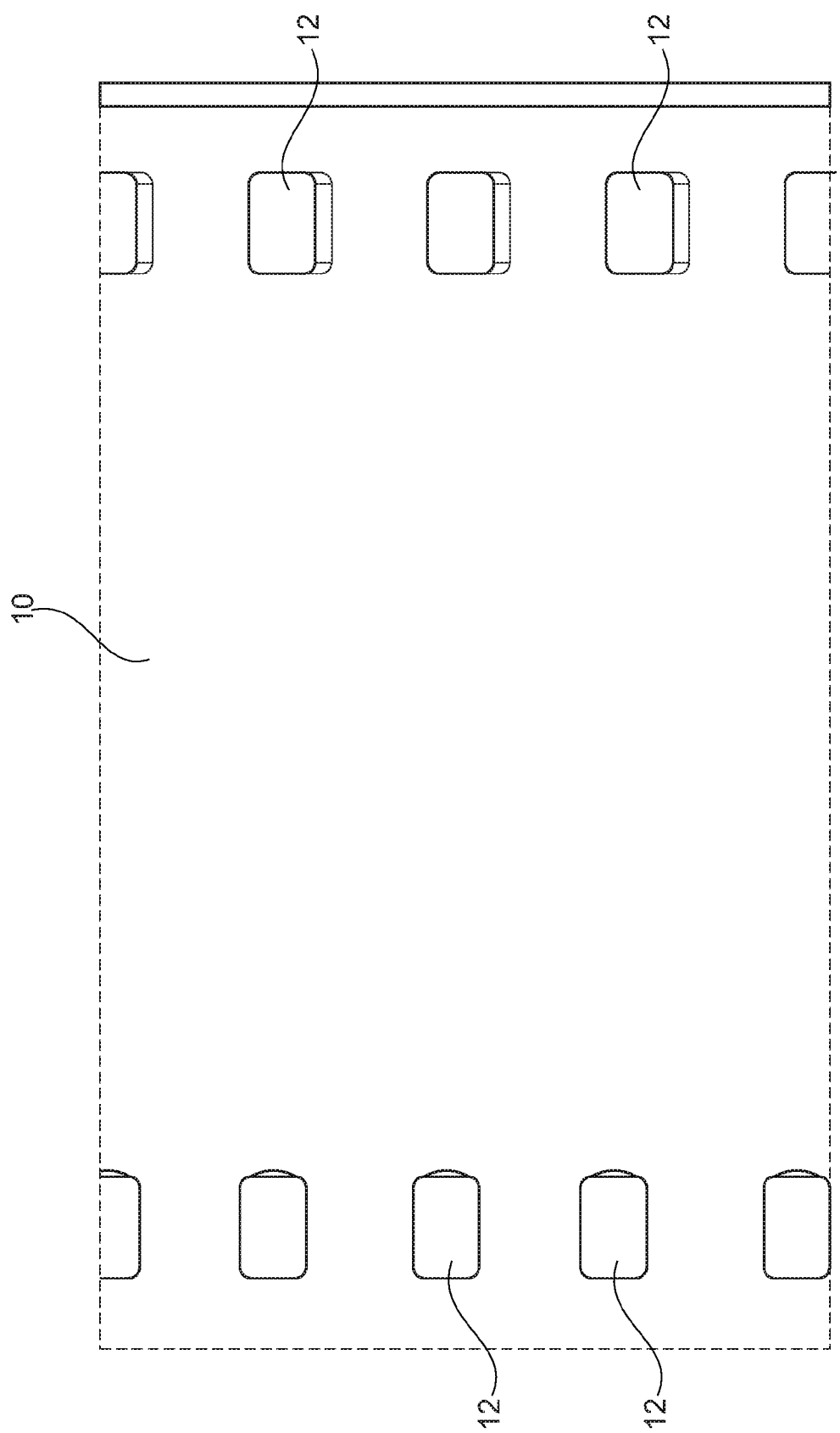
FIG. 1 is a representation of a clear film leader exposed on an uncalibrated scanner according to the prior art.

FIG. 1 is a view of a clear film leader 10 exposed on an uncalibrated scanner. The light intensity is greatest at the center and then drops at the edges. Perforations 12 are located at the edges. It is apparent in FIG. 1 that the light intensities are varying from the top to the bottom, and left to right. However, if a set of intensity filters are applied to render the image in a manner which highlights intensity differences at high and low intensities, then this variation becomes much more readily apparent.

Figure 2:
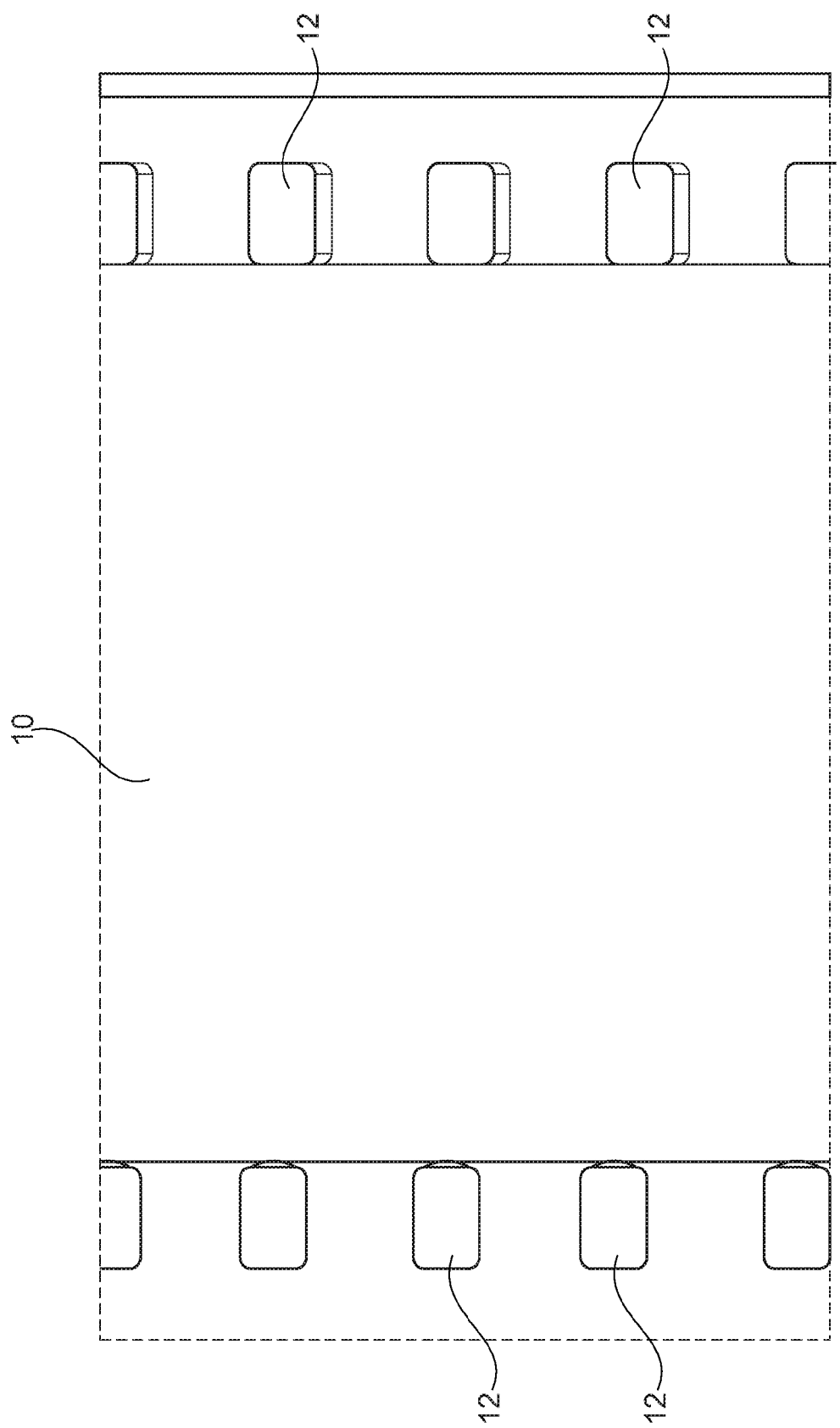
FIG. 2 is a representation of the same image shown in FIG. 1 where calibration has been applied to the image portion.

FIG. 2 shows where calibration has been applied to the clear film leader image of FIG. 1. The differences between FIG. 1 and FIG. 2 clearly shows the inherent variations in exposure across the imaging field.

Figure 3:
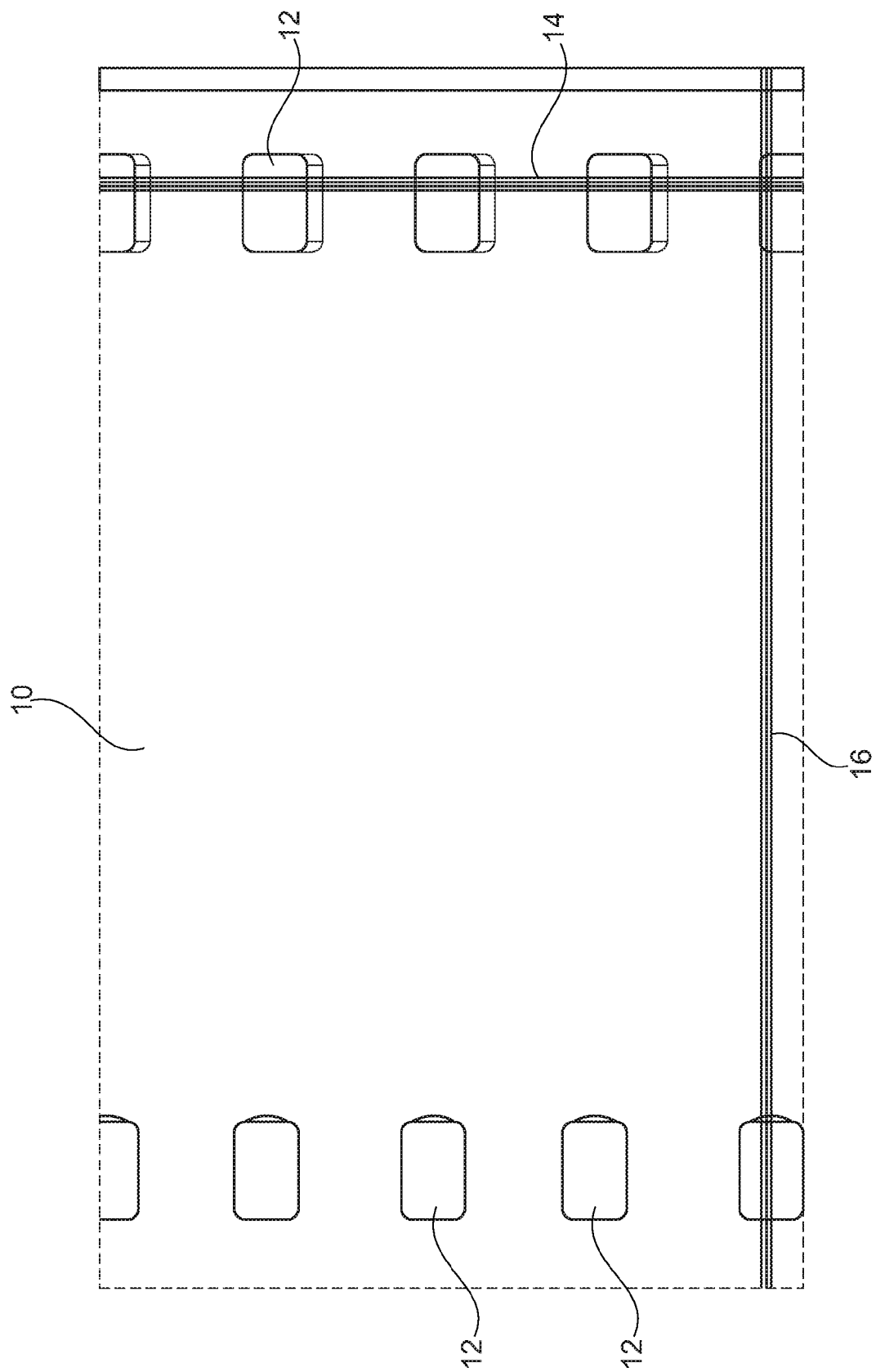
FIG. 3 is a representation of the images with calibration pattern lines extending vertically and horizontally.
Figure 4:
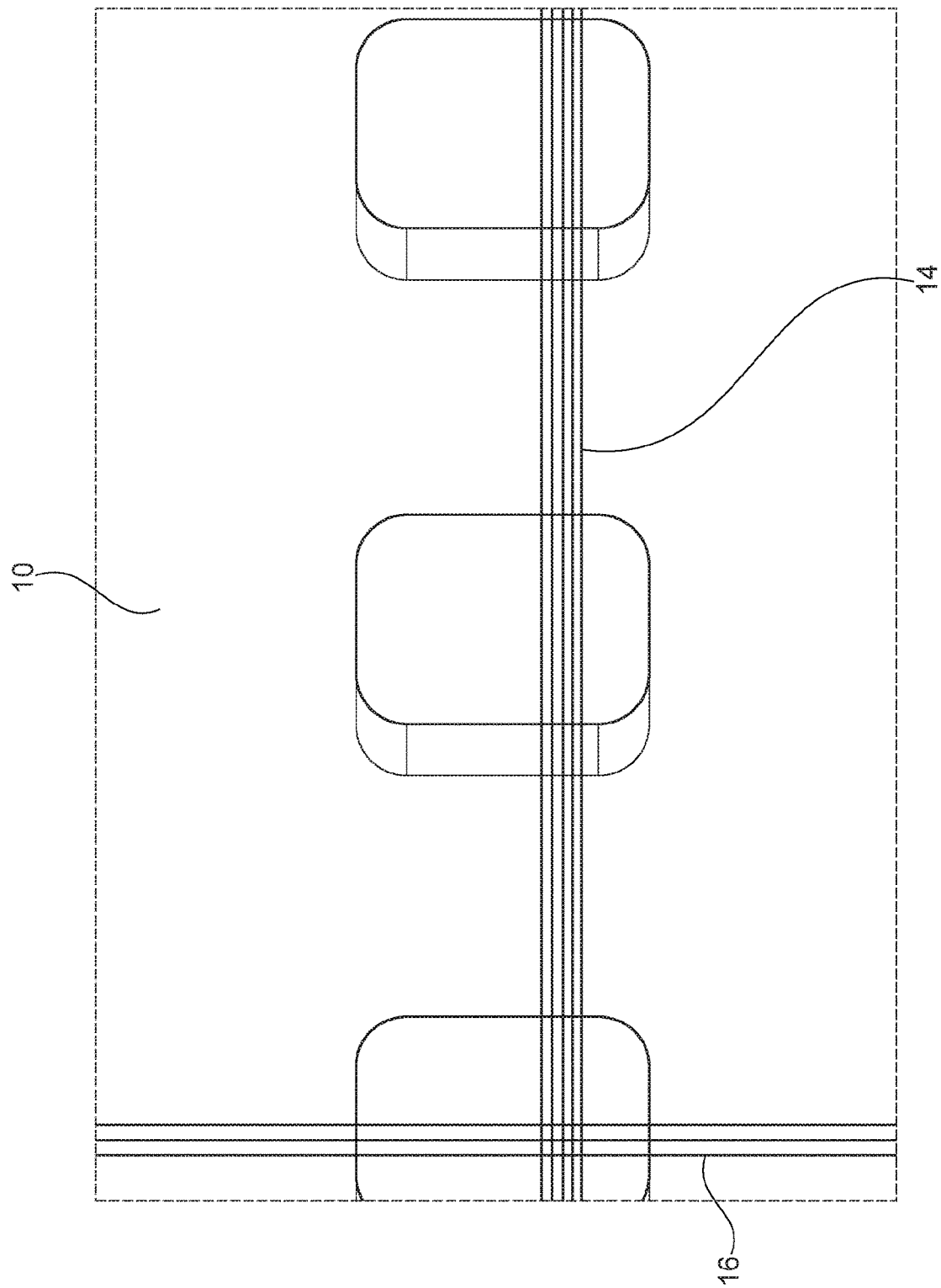
FIG. 4 is an expanded view of part of the image shown in FIG. 3.

During the scanning of a motion picture film, the perforations 12 are also scanned. As previously described by the current applicant in EP 12795584.7 and U.S. Ser. No. 14/352,053, which are incorporated herein by reference, information may be placed in the perforations. To overcome the calibration problem the present invention proposes the use of a transparent calibration pattern being placed in front of or behind the film 10. FIG. 3 and FIG. 4 are representations of the image in FIG. 1 with the calibration lines of the calibration pattern extending horizontally and vertically. By proceeding in this manner we are able to view the calibration pattern through the gap formed by the perforations 12. Therefore, by measuring the intensities of the calibration pattern, it is possible to measure the intensities at the (typically) eight perforation areas in a 4-perforation motion picture frame. It is then possible to measure intensities of the light to both evaluate intensity variations, and to apply corrections to the scanned image.

For example, it is possible to use only 'fresh air' as the calibration pattern. It has been found that although only 'fresh air' works well for high intensities, we need to also include low density calibration patterns in the form of lines 14, 16 to accurately handle low intensity variations. The lines 14, 16 intersect through the perforations 12 both vertically and horizontally.

It is important to note that if scans are made where the image capture is not synchronised to the scanner advance (as per EP 12795584.7 and U.S. Ser. No. 14/352,053), then the position of the perforations 12 will move from frame to frame. It is therefore possible to see the calibration pattern lines 14, 16 at multiple positions in the imaging field, and it is possible to construct a very accurate map of intensity variation across the whole sensor. It is the purpose of this invention to enable the calibration tables to be dynamically calculated by using the intensities of the test pattern.

Using calibration patterning lines used outside of the image is possible as the increase in scanning resolution makes it possible to scan larger areas, while still having sufficient resolution to capture all the detail of the film.

The calibration patterns can be red/yellow/green lines, but it should be understood that any number and colour of lines may be used.

The calibration pattern as shown in FIGS. 1 to 4 is less than the width of perforations running up and down the sides of the film. This means that the calibration pattern should always be visible through the perforation 12, even when the film 10 moves slightly from side to side as is typical in a drive system that does not use sprockets.

The pattern forming the calibration lines 14, 16 consist of a number of stripes of different density, four are shown but any number may be used. The total width of the four stripes may typically be around 0.5 mm-2 mm or about 1 mm. The optical density of the stripes may typically be in the range from about 0.5 to 4 and preferably about 0.5, 1.0, 2.0 and 3.5. Given that the present invention uses 'fresh air' also, this gives 5 densities to be used to calibrate from which is a further advantage of the present invention.

The test pattern is typically be enclosed in a glass plate (similar to that used for test samples as viewed under a microscope) and is placed underneath a film gate, typically 2-3 mm underneath the film. Given that the scanner has reasonable depth of field—which is important for an archive scanner as older film will not be flat—the density of the pattern will be measurable even though the image of the pattern will not be sharp. Given that the pattern is in a glass plate, any contact with badly warped film will not be harmful to the film. Further, given that the pattern is in a glass plate, it will remain flat to the camera lens so there will be no exposure variations due to movement or loss of tension.

Each digitised image of a camera frame therefore has at least some the calibration pattern visible through one perforation 12 (e.g. 16 mm) or four perforations (e.g. 35 mm). Software can determine the intensity of the (typically four) stripes of the test pattern and therefore compute the exposure applied by the scanner. Through a calibration process, 'ideal' values for these intensities will be known, and using the intensities of each image we can therefore determine the exposure variation of each image. This enables the user to determine whether the exposure applied to each frame was as intended. If the intent was to scan the film 10 at a constant light, then we can use the computed variation to correct minor changes in exposure or to determine that the exposure variation was unacceptable and hence reject the scan. In the case that the exposure variation was intentional—for example where light and dark sections of film are spliced together—the computed variation serves both to validate that the exposure was varied correctly, and to serve as a historical record of what exposure variation was applied. This information can then be used when the reel is viewed so that the user can see the film with or without the exposure variations applied. Where the scanner uses an unsynchronised advance, then the perforations 12 move relative to the vertical axis of the camera frame. This means that a different section of the calibration pattern will be visible with each successive exposure. This means that we will see the exposure applied at a different vertical section of the frame. We can therefore validate that the exposures at each section are the same, and correct for minor differences encountered. Over even a small reel of film, it is likely that the perforations will move fully from top to bottom of the exposure field, which means that we can therefore compute exposure corrections for the full height of the frame.

Since the test pattern will remain in the digitised image of every frame, we will now have a permanent indicator of the exposure used in every scanned image. This means that scans can now be interpreted according to a universal standard. It also means that we can compensate for minor intensity variations during a scan. Further, it allows us to vary scanner intensities to suit content, yet to preserve a record of such variations in a way that means the information cannot be detached from.

Whilst specific embodiments of the present invention have been described above, it will be appreciated that departures from the described embodiments may still fall within the scope of the present invention. For example, any suitable type of calibration patterns may be used.

The invention claimed is:

1. A method of calibrating digital images or digital video clips representative of images and/or data stored on or with one or more frames of a film comprising:
    imaging the film using a film scanner to obtain scanned images or video clips;
    placing a transparent calibration pattern in front of or behind a film so that a portion of the transparent calibration pattern is imaged through perforations in the film to form an imaged calibration pattern, the width of the calibration pattern being less than the width of the perforations running up and down sides of the film so the calibration pattern is imaged through the perforations; and
    determining scanner exposure variation using the imaged calibration pattern,
    wherein each digitized image of a frame of the film has at least some calibration pattern visible through one or more perforation; and
    wherein the calibration pattern remains in the digitized image of every frame of the film.

2. The method of claim 1, wherein the transparent calibration pattern comprises a transparent substrate.

3. The method of claim 1, wherein the transparent calibration pattern comprises a pattern of at least one or more lines extending through perforations on the film.

4. The method of claim 1, wherein the calibration pattern is in the form of lines extending down the sides of the film.

5. The method of claim 1, wherein the calibration pattern is in the form of a series of co-parallel lines with lines extending down the length of the film through the perforations in the film and also extending transversely across the film from one perforation to another.

6. The method of claim 1, wherein the calibration pattern comprises a series of patterns at right-angles to each other.

7. The method of claim 1, wherein the calibration pattern is capable of being viewed by a user to allow calibration of the motion picture scan.

8. The method of claim 1, wherein the calibration pattern allows both high and low intensity patterns to be calibrated.

9. The method of claim 1, wherein the calibration pattern is viewable at multiple positions in an imaging field.

10. The method of claim 1, wherein the calibration pattern constructs a map of intensity variation across a whole sensor.

11. The method of claim 1, wherein the calibration pattern enhances error corrected film images, digitally enhanced images, soundtracks, or a combination thereof.

12. The method of claim 1, wherein the calibration pattern verifies that scanner intensity exposure has been varied and correctly implemented.

13. The method of claim 1, wherein the calibration pattern determines and corrects scanner color bias.

14. A The method of claim 1, wherein when the film is 35 mm and has no soundtrack, a calibration pattern is mounted on both sides of the film so that there is a measurement on both left and right intensities of an imaging field.

15. The method of claim 1, wherein, when the film is 35 mm and has an analogue soundtrack, then the calibration pattern is mounted on the side of the film without soundtrack.

16. The method of claim 1, wherein when the film includes one set of perforations, the calibration pattern is mounted on the side of the film with the perforations.

17. The method of claim 1, wherein, the calibration pattern is removable.

18. The method of claim 1, further comprising the step of providing a low density test pattern, wherein the low density test pattern is provided when the film is faded and exposed at low intensity.

19. The method of claim 1, further comprising the step of providing a high density test pattern, wherein the high density test pattern is provided when the film is faded and exposed at high intensity.

\* \* \* \* \*